July 16, 1957 W. MARGRAVE 2,799,470
SEALING ASSEMBLY FOR VALVES
Filed March 18, 1948

INVENTOR
WILTON MARGRAVE
BY
ATTORNEYS

United States Patent Office 2,799,470
Patented July 16, 1957

2,799,470

SEALING ASSEMBLY FOR VALVES

Wilton Margrave, Cleveland, Ohio, assignor to The Parker Appliance Company, Cleveland, Ohio, a corporation of Ohio Application March 18, 1948, Serial No. 15,645

2 Claims. (Cl. 251—172)

This invention relates to seals for valves and more particularly relates to sealing assemblies mountable in a valve port and adapted to seal both the movable valve member and the wall of the port.

The invention is adaptable to several types of valves, such as rotary plug, rotary plate, sliding plate, and others. It is particularly suited for application in selector and shutoff valves in aircraft fuel systems where it is important that the valves seal off tightly over extended periods of operation. To accomplish this, the seal assembly is movably mounted within the valve port and is urged partly by fluid pressure and partly by spring pressure into engagement with the movable valve member, thus automatically taking up wear of the parts and also compensating for any incidental movement of the valve member to or from the sealing assembly.

In some forms of the invention, however, it is desirable to so proportion the parts that fluid pressure will be ineffective for seating the seal assembly and a spring alone used for this purpose.

Another requirement of aircraft fuel selector valves is that detent indexing be provided so that the operator may feel when the valve has reached a predetermined position. Such indexing usually takes the form of spring fed detents that require a higher torque to pass over an index position than is required for turning the valve between the indexing positions. The difference between these torques provides the feel which signals the operator when the valve is in an indexed position.

The present invention, although not directed to any part of an indexing mechanism, facilitates the obtaining of turning torques which are generally low and which afford good indexing feel. This is accomplished by controlling the force with which the sealing assembly seats against the movable valve member under the action of fluid pressure and by holding the force substantially constant regardless of whether the fluid is acting from within the valve port or from within the valve chamber, as will be the case under different conditions of fluid flow through the valve.

An object of this invention is to provide a sealing assembly which seals effectively over extended periods of operation and which automatically compensates for wear and incidental lateral shifting of the movable valve member.

Another object is to provide a sealing assembly in which fluid pressure from within either the valve or the port will aid in seating the assembly against the movable valve member.

Another object is to provide a fluid pressure responsive sealing assembly in which the effective area upon which the fluid acts to seat the assembly against a movable valve member may be controlled to any predetermined amount.

Another object is to provide a sealing assembly movably mounted within a valve port and sealed from the port wall by a diaphragm and in which the diaphragm is completely supported against tensile stresses caused by fluid pressure acting upon the diaphragm and which would otherwise tend to blow out or rupture the diaphragm.

Another object is to provide a sealing assembly having a seal for a movable valve member and responsive to fluid pressure acting either interiorly or exteriorly of said seal for seating the assembly and in which the seating pressure is substantially the same regardless of whether the fluid is acting interiorly or exteriorly of the seal.

Another object is to provide a sealing assembly movably mounted within a valve port and sealed from the port wall by a diaphragm and in which the diaphragm is supported so that it is at all times free of tensile stresses and hence cannot exert any force upon the assembly by virtue of tension in the diaphragm.

Another object of the invention is to provide a sealing assembly movably mounted within a valve port and sealed from the port wall by a diaphragm clamped to the wall and in which the clamping member extends from the valve port and is provided with means for attachment to a pipe line or other suitable fluid flow device.

Other objects will become apparent from the following detailed description in which, Figure 1 is a fragmentary horizontal cross sectional view of a rotary plug type valve and showing one form of the seal as mounted in the valve port and showing only small portions of the valve casing and the movable valve member. This view also shows the position assumed by the diaphragm when the fluid is acting from within the port; that is, interiorly of the seal against the movable valve member.

Figure 1:
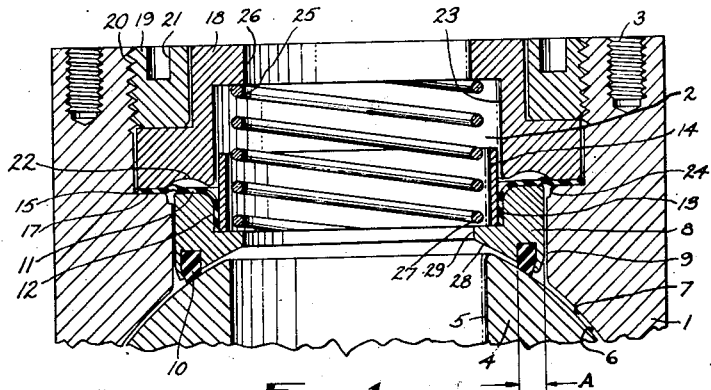
Figure 2:
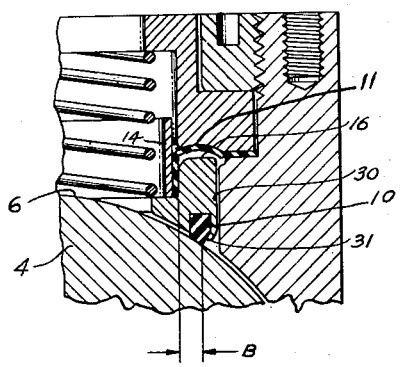
Figure 2 is a fragmentary view similar to Figure 1 but showing the position assumed by the diaphragm when the fluid is acting from within the valve chamber, that is, exteriorly of the seal against the movable valve member, and showing the rotor in closed position.

In the form of invention as shown in Figures 1 and 2, reference numeral 1 represents a portion of a valve casing and 2 is a valve port to which any fluid receiving or dispensing device or pipe line may be connected by means of the threaded holes 3. A spherically shaped valve plug 4 is rotatably mounted in the casing and has a passage 5 and a solid wall 6 alternately movable into and out of registry with the casing port for permitting or blocking off flow of fluid between the rotor passage and the valve port.

The sealing assembly of this invention is mounted within the port 2 and engages the rotor 4 so as to prevent leakage of fluid between the port and the valve chamber 7 when the rotor is in either open or closed position.

The sealing assembly includes a carrier 8 slidable in the port bore 9 and to this carrier is attached a packing ring 10 preferably of rubber or rubberlike material, which ring is adapted to sealingly engage the valve rotor. In this form of the invention the packing 10 is illustrated as having contact with the rotor over a substantial width or area. Sealingly attached to the outer end of the carrier is a flexible diaphragm 11 preferably made of rubberlike material or of fabric impregnated or coated with rubberlike material so as to be impervious to the passage of fluid therethrough. The diaphragm has a tubular portion 12 which is pressed against the counterbore 13 of the carrier by means of the sleeve 14 to sealingly attach the diaphragm to the carrier.

The diaphragm also has a flange portion 15 which extends across the rear face 16 of the carrier and is sealingly clamped against the port shoulder 17 by means of the follower 18 and ring nut 19. The ring nut may be threaded into and out of the threaded port counterbore 20 by means of a spanner wrench inserted in the holes 21.

The inner end of the follower 18 may be grooved as at 22 to provide clearance in which the diaphragm may have limited movement. The end face of the follower is positioned close enough to the diaphragm so as to support the unclamped portion of the flange 15 against the action of fluid pressure from within the valve chamber 7 without causing the diaphragm to exert an axial pull upon the carrier, as illustrated in Figure 2.

The sleeve 14 extends beyond the diaphragm and into close telescoping engagement with the counterbore 23 of the follower to support the diaphragm against radially inward displacement due to fluid pressure.

A small relief groove 24 may be placed adjacent the shoulder 17 to prevent cutting or damage to the rubber due to the movement of the carrier 8. A spring 25 constantly urges the carrier toward the movable valve member.

The sealing assembly illustrated in Figures 1 and 2 functions in the following manner.

When fluid is present in the valve port, either when the valve is open as shown in Figure 1 or closed as shown in Figure 2, the fluid within the port is prevented from leaking into the valve chamber 7 by means of the packing 10 and also by means of the diaphragm 11.

Some of the fluid within the port passes between the sleeve 14 and the follower bore 23 and acts upon the upper surface of the diaphragm forcing it against the upper face 16 of the carrier. The fluid also imparts downward pressure on the upper end of the sleeve 14 and on the spring seat shoulder 27. Opposing the downward pressure of the fluid upon the carrier 8 is an upward pressure of the fluid on the surface 28 bounded by the follower bore 29 and the inner point of contact between the packing 10 and the rotor 4. Since the area of the carrier subject to downward pressure is greater than the area subject to upward pressure, there will be an effective area in the downward direction. This area is a ring having the width A as shown in Figure 1.

It will be noted that the diaphragm is entirely supported on its under side in such a way that there are substantially no tensile forces set up in the diaphragm and all of the force applied to it by the fluid is transmitted to the carrier by compressive rather than tensile stresses upon the diaphragm, the groove 24 being too small to permit any appreciable deflection of the diaphragm thereinto which otherwise would result in a tensile stress in the diaphragm which in turn would be transmitted to the carrier.

When fluid is within the valve chamber 7 but not in the port 2, regardless of whether the valve is open or closed, it passes by the slight clearance space 30 between the carrier and the port bore 9 and forces the diaphragm upwardly against the follower face 22 as shown in Figure 2, and acts downwardly on the carrier face 16. The fluid also acts upwardly on the under face 31 of the carrier to the outer contact point between the packing 10 and the rotor 4. Thus the total downward force will be determined by the difference in area of these two faces, the effective area being a ring of width B.

When the fluid is thus acting it will be noted that substantially the entire upper side of the diaphragm is supported by the follower 18. Since the follower is rigidly clamped to the wall of the port 2 it cannot move relatively therewith and thus axial movement of the diaphragm is limited. Also, the telescoping relation of the sleeve 14 with the follower bore 23 prevents any part of the diaphragm from blowing out in a radially inward direction. Therefore the diaphragm is so supported that fluid pressure from within the valve is prevented from imposing tensile stresses thereupon.

It will be observed that since the width A is approximately the same as the width B and lies on nearly the same mean diameter, the effectiev area subject to downward fluid pressure is approximately the same regardless of whether the fluid is acting from within the port as in Figure 1 or from within the valve as in Figure 2. Thus the frictional resistance to turning which the carrier applies to the rotor is approximately the same for any given fluid operating pressure. The indexing feel for the valve is the difference between the turning effort required when in an indexed position and when between indexing positions. Indexing detents as commonly used provide relatively high but substantially fixed resistance to turning at the index position, and a lower but still substantially constant resistance between the index positions. The remaining resistance to turning is supplied largely by the friction of the sealing assembly and since this is the same regardless of whether fluid is in the port or within the valve chamber, the indexing "feel" also remains substantially constant under these conditions.

Figure 3:
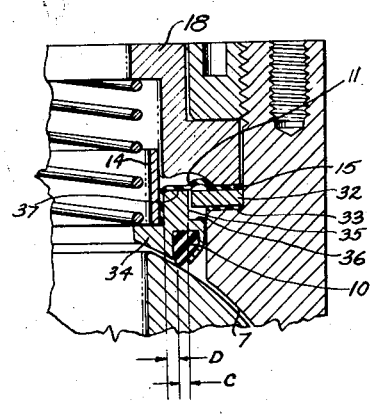
Figure 3 is a fragmentary view similar to Figure 1 but showing a slightly modified form in which a balancing washer is utilized for reducing the effective area against which fluid from within the port acts to seat the assembly against the movable valve member.

Figure 3 illustrates a modification in which a balancing washer 32 is utilized for reducing the effective areas subject to fluid pressure. The washer is rigidly clamped to the port wall by the follower 18 and is sealed above and below by the diaphragm flange 15 and the gasket 33.

The carrier 34 is cut away as at 35 so as to reduce the area of the end surface 37 to a predetermined amount, and to provide a second transverse face 36 spaced from the end face 16. The washer 32 overlies the face 36 and extends closely adjacent the reduced end surface 37. The upper face of the washer is in substantially the same plane as the surface 37. In this form the lower face of the packing 10 is shown as being tapered to a narrow edge so that it engages the rotor with substantially line contact, although a wide contact such as in Figure 1 could be used if desired.

As before, when fluid pressure is within the valve port, it gains access to the top of the diaphragm and forces it downward against the carrier end face 37 as shown in Figure 3. The washer 32 supports the diaphragm to a point closely adjacent the carrier end face 37 and thus prevents the portion of the diaphragm flange not directly in contact with the end face 37 from exerting any tension forces upon the carrier tending to move the carrier to or from the valve rotor 4.

The effective area subject to downward pressure from the fluid in the port is now an annular ring of width C, which is the outer diameter of the face 37 less the diameter of the contact point for packing 10.

When fluid is within the valve chamber 7 of Figure 3 it acts downward across the reduced face 37 and the face 36 and upward on the lower face of the carrier bounded by the largest diameter of the carrier and the diameter of the packing contact line, resulting in a downwardly effective area represented by the ring of width D.

It will be observed that the effective areas represented by rings of width C and D are approximately equal but are less than the effective areas represented by rings of width A and B for Figures 1 and 2. The balancing washer 32 therefore provides a convenient means of reducing and adjusting the effective areas subject to axially acting fluid pressure.

Figure 4:
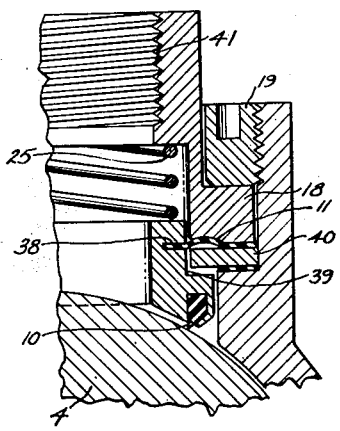
Figure 4 is a fragmentary view similar to Figure 2 but showing a further modification in which the areas on the seal assembly subject to fluid pressure are so arranged that the fluid pressures tending to axially move the seal assembly are completely balanced and the assembly is at all times seated solely by spring pressure.

Figure 4 illustrates a modification in which the opposed end faces of the carrier upon which fluid acts are so arranged that the fluid exerts substantially no seating pressure upon the carrier regardless of whether the fluid is acting from within the port or valve chamber. All seating pressure is supplied solely by the spring 25.

In this form the tubular portion of the diaphragm is omitted and the flat diaphragm is directly clamped in the groove 38 of the carrier. The contact point of the packing 10 with the rotor 4 is of the same diameter as the point of attachment of the diaphragm to the carrier, which latter is determined by the diameter of the extended portion 39. The diaphragm is supported closely adjacent the attachment point on either side by the follower 18 and the balancing washer 40, and is therefore incapable of transmitting any axial forces to the carrier by reason of fluid pressure acting upon the diaphragm.

As no loose portion of the diaphragm contacts or transmits axial forces to the carrier the carrier is affected only by fluid acting directly thereupon. Any effective area upon which fluid from either the port or valve chamber acts to impart axial force upon the carrier is determined by the difference between the diameter of the point of attachment and the diameter of the contact point between the packing 10 and the valve rotor. Since these diameters are substantially equal there will be no appreciable effective area for fluid acting from either direction and hence there will be no tendency for the carrier to be seated or unseated by fluid pressure.

Figure 4 also illustrates an optional method of providing an attachment means for a pipe line to be connected to the valve. In this form the follower 18 is extended beyond the clamp ring 19 and is suitably threaded as at 41 for connection with a pipe. Obviously, the extended portion may be exteriorly threaded or formed in any other well known manner for attachment to a connecting pipe or other receiver. This optional method obviates the necessity of providing a gasket between the end face of the port and a pipe connector (not shown) as is otherwise required for the form as shown in Figure 1.

All figures of the accompanying drawing show the sealing assembly as applied to a rotary plug type valve in which the rotor is spherical, but it is obvious that the identical sealing assemblies may be used on valves in which the movable member is a flat plate movable in either a rotary or rectilinear path. The same assemblies can also be used for poppet or other type valves in which the valve member is movable endwise to and from the seal.

With slight modification the invention may be used for other types of valves, for example, by suitably contouring the seating face the sealing assembly may be used with valves having cylindrical or conical rotary or slidable valve members.

It is also obvious that other changes may be made without departing from the essence of the invention as defined in the following claims.

I claim:

1. In a valve, a casing having a valve chamber and a port, a valve member movably mounted in said chamber, a sealing assembly mounted in said port and having a fluid passage therethrough in communication with the valve chamber, said sealing assembly comprising an annular carrier having a sealing face at one end thereof and engaging said valve member, an annular, a flexible diaphragm means rigidly attaching said diaphragm at its inner margin to the carrier, non-yielding means attaching the outer margin of said diaphragm within the casing, said diaphragm having a free annular portion between the attached inner and outer margins, the terminal inner and outer marginal portions of said free annular portion lying substantially in a plane which is perpendicular to the axis of the carrier, said non-yielding means including an annular non-yielding surface extending from the one attached margin to the other attached margin of said diaphragm and disposed generally perpendicularly with respect to the axis of the carrier and directly opposed to and closely adjacent one side of said free annular portion of the diaphragm, said free annular portion of the diaphragm being of a width greater than the straight radial line distance between the attached margins of the diaphragm and at least as great as the distance along said annular non-yielding surface opposite said free annular portion whereby the entire free annular portion of the diaphragm may be freely flexed directly against said annular non-yielding surface and supported thereby with the free annular portion of the diaphragm free of tensile stresses tending to move the carrier.

2. Valve structure as defined in claim 1 wherein the annular non-yielding surface directly opposed to said one side of the free annular portion of the diaphragm includes an annular groove opening away from said one side of the free annular portion of the diaphragm so that the free annular portion of the diaphragm can flex thereinto and having inner and outer marginal portions lying close to the terminal inner and outer marginal portions of said free annular portion of the diaphragm, said free annular portion of the diaphragm being of a width for lying against the full width of said groove when flexed thereinto without imposing tensile stresses at said inner and outer marginal portions of the diaphragm which would tend to move the carrier.

References Cited in the file of this patent

UNITED STATES PATENTS

| | | |
|---|---|---|
| 1,671,255 | Porter | May 29, 1928 |
| 1,784,381 | O'Stroske | Dec. 9, 1930 |
| 2,191,232 | Heinen | Feb. 20, 1940 |
| 2,390,201 | Bredenbeck | Dec. 4, 1945 |
| 2,392,198 | Snyder | Jan. 1, 1946 |
| 2,404,816 | Snyder | July 30, 1946 |
| 2,417,400 | Snyder | Mar. 11, 1947 |
| 2,471,941 | Downey | May 31, 1949 |
| 2,520,288 | Shand et al. | Aug. 29, 1950 |
| 2,603,449 | Overholser | July 15, 1952 |
| 2,751,185 | Shand | June 19, 1956 |